United States Patent [19]

Richardson

[11] Patent Number: 5,044,115

[45] Date of Patent: Sep. 3, 1991

[54] FLORAL STEM CLEANER AND METHOD OF CLEANING FLORAL STEMS

[76] Inventor: Robert L. Richardson, 17750 Fruitport Rd., Spring Lake, Mich. 49456

[21] Appl. No.: 419,518

[22] Filed: Oct. 10, 1989

[51] Int. Cl.⁵ ............................................. A01G 1/04
[52] U.S. Cl. .................................. 47/1.01; 144/2 Z; 460/134
[58] Field of Search .............. 144/2 Z; 47/1.01; 56/1; 460/134

[56] References Cited

U.S. PATENT DOCUMENTS

| 19,688 | 3/1858 | Dickey | 460/134 X |
| 442,015 | 12/1890 | Carr | 460/134 X |
| 2,592,833 | 4/1952 | Swanson | 47/1.01 |
| 4,509,536 | 4/1985 | Bennett et al. | 460/134 |

Primary Examiner—Richard E. Chilcot, Jr.
Assistant Examiner—Linda J Watson
Attorney, Agent, or Firm—Price, Heneveld, Cooper, DeWitt & Litton

[57] ABSTRACT

A flower stem cleaning device includes a body through which a cleaning opening extends. The opening is defined by a flexible surface portion of the body to prevent damage to the plant stems. A slit extends between the opening and a perimeter edge of the body to define jaws which may be flexed in order to insert a stem into the opening. The stem to be cleaned is pulled through the opening manually to remove thorns and miscellaneous foliage from the stem.

17 Claims, 1 Drawing Sheet

U.S. Patent  Sep. 3, 1991  5,044,115

FLORAL STEM CLEANER AND METHOD OF CLEANING FLORAL STEMS

BACKGROUND OF THE INVENTION

This invention relates to a device and method for cleaning the stems of flowers and other plants. The invention is especially adapted for removing thorns from rose stems. More particularly, the invention concerns such a device and method that are effective and easy to use but do not damage the stem.

The stems of flowers, particularly roses, are typically cleared of thorns and spurious foliage before combining the flowers in an arrangement. Various hand-held tools for accomplishing this task have been proposed. Examples include U.S. Pat. Nos. 2,681,504 and 2,806,325 issued to Fox and U.S. Pat. No. 2,646,621 issued to Catanese. While such hand-held tools have the advantage of being relatively inexpensive, there is a significant risk of damage to the stem with their use, particularly in the hands of an unskilled user. Additionally, as with any hand-held tool, such stem cleaners are easily misplaced and not always available when needed. These difficulties have been addressed by relatively complex automated devices which, for example, remove thorns and other foliage by a series of rubber fingers extending radially outwardly from a motor-driven shaft. In addition to the significant monetary outlay required, such mechanized stem cleaners are typically effective over only a portion of the flower stem.

SUMMARY OF THE INVENTION

The present invention provides a device and a method using such device for removing thorns and foliage from flower stems. The device includes a body and surface means associated with the body for defining a flexible opening through the body. The method according to one aspect of the invention includes inserting a stem of a plant or flower into the flexible opening and pulling the stem through the opening. The surface means defining the flexible opening engages and removes thorns and foliage extending from the stem. Such method readily removes thorns and foliage from a flower or plant stem without damaging the stem. Importantly, any extent of a stem may be cleaned using such method, including the entire length of the stem.

According to another aspect of the invention, the portion of the body defining the flexible opening is made of a flexible material and a slit is defined between the flexible opening and a perimeter edge of the body portion. In this manner, a stem may be readily inserted into the opening by flexing the flexible material portion adjacent the slit to separate this slit. This eliminates complicated mechanical movements while maintaining consistency in the size of the flexible opening. Thus, only minimal skill is required for utilizing the invention.

According to yet another aspect of the invention, means are provided for mounting the device to a stationary support such as a work table or a waste receptacle. When mounted in this fashion, the flexible portion of the device may be flexed by one hand of the operator while inserting the stem into the opening and pulling the stem through the opening with the other hand of the operator. This allows for a rhythmic motion that enhances productivity. Additionally, such permanent mounting eliminates the difficulty of misplacing the device. These and other objects, advantages and features of this invention will become apparent upon review of the following specification in conjunction with the drawings.

DESCRIPTION OF THE PREFERRED EMBODIMENT

Figure 1:
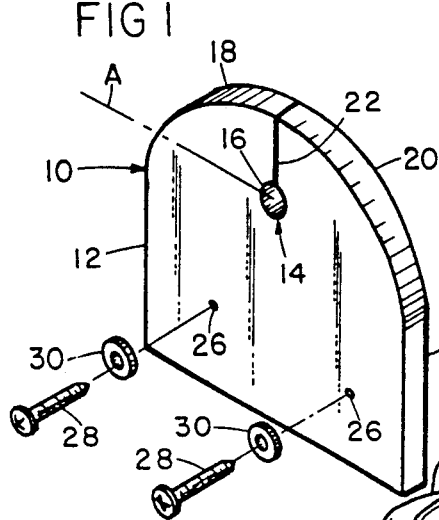
FIG. 1 is a perspective view of a stem cleaning device according to the invention.
Figure 2:
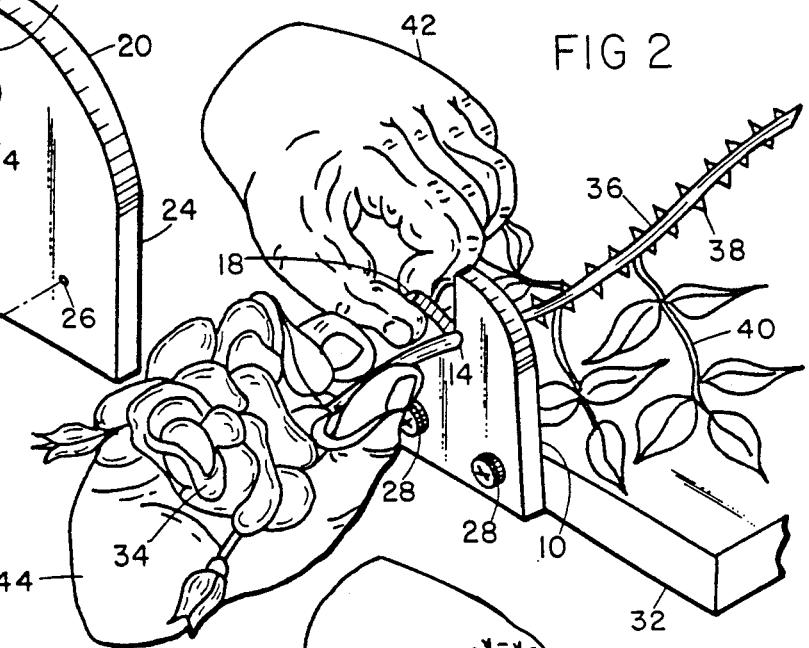
FIGS. 2-4 illustrate the device in FIG. 1 being used to perform the method aspects of the invention.
Figure 3:
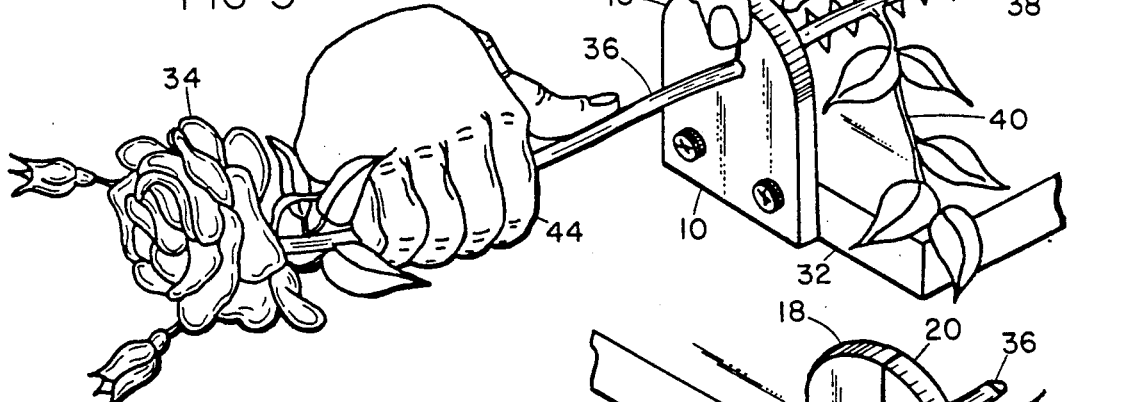
Figure 4:
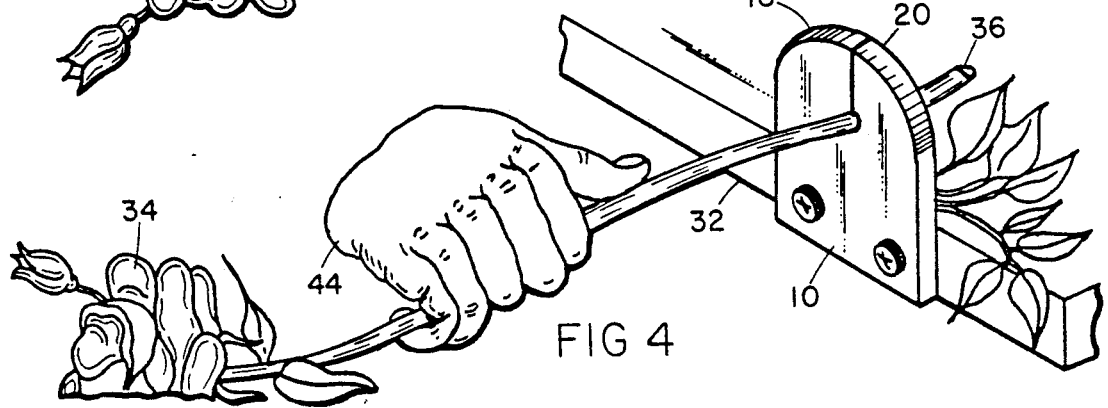

Referring now specifically to the drawings, and the illustrative embodiments depicted therein, a plant stem cleaning device 10 includes a body 12 having an opening 14 extending therethrough. Opening 14 is defined by a surface 16 which is flexible in order to avoid damage to plant stems. Body 12 further includes a pair of jaws 18 and 20 which are separated by a slit 22 which extends through body 12 between opening 14 and a perimeter edge 24 of the body. Jaws 18 and 20 are mutually aligned in the plane of body 12 and flex With respect to the rest of the body along an axis generally shown at A. When either jaw 18, 20 is flexed in this manner, the interior of opening 14 is accessible to a plant stem through slit 22. However, jaws 18 and 20 resist movement in their common plane in order to maintain a consistent size to opening 14. Mounting means, including a pair of holes 26 through body 12, screws 28 and washers 30, provide means for mounting cleaning device 10 to a stationary support such as table 32 (FIGS. 2-4). In the illustrated embodiment, body 12 is substantially entirely made of a flexible material which is, preferably, a durable synthetic rubber such as neoprene. Body 12 is most preferably die-cut from one-quarter inch sheet of such neoprene rubber.

As seen by reference to FIGS. 2-4, a plant such as flower 34 includes a stem 36 which arrives at the florist with numerous thorns 38 and foliage 40 extending from the stem. In order to remove thorns 38 and foliage 40 from stem 36, one jaw 18, 20 is flexed about axis A with one hand 42 of the operator a sufficient distance to allow stem 36 to be inserted into opening 14 by the other hand 44 of the operator. The stem is inserted into the opening at the location on the stem below which the thorns and foliage are to be removed. This location may be closely adjacent the flower petals. Once stem 36 is within opening 14, the jaw 18, 20 is released and returns to its orientation coplanar with the other jaw. The operator then applies a pulling force on stem 36 with hand 44 and may, if desired, provide support to jaws 18, 20 with the other hand 42. Because opening 14 is selected to be slightly larger than the largest stem 36 to be encountered by device 10, the movement of stem 36 through opening 14 causes the thorns and foliage to be removed by flexible surface 16. Once the stem is cleaned, one jaw 18, 20 is flexed and stem 36 is removed from cleaning device 10.

While opening 14 is illustrated as circular in cross section, it could alternatively be oval, elliptical or other shape in cross section. Although the cost of materials to produce cleaning device 10 suggests that it is preferably disposable when worn, flexible surface 16 could alternatively be provided as part of a replaceable lining for opening 14. Other changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows.

1. A device for removing thorns and leaves from a plant stem comprising:
   a body;
   a pair of jaws aligned in a plane and defining therebetween a substantially constant-size opening extending along an axis traversing said plane; and
   means for mounting said jaws to said body in a manner that at least one of said jaws is movable away from the other one of said jaws in a direction generally parallel said axis and is biased toward said plane.

2. The device in claim 1 wherein said jaws are made from a flexible material to define flexible sidewalls of said opening.

3. The device in claim 2 further including mounting means for mounting said body to a stationary surface whereby, one hand of an operator can move said one of said jaws to insert a plant stem into said opening and the other hand of an operator can manipulate said stem.

4. The device in claim 1 further including mounting means for mounting said body to a stationary surface whereby, one hand of an operator can move said one of said jaws to insert a plant stem into said opening and the other hand of an operator can manipulate said stem.

5. A method of removing thorns and foliage from plant stems including the steps of:
   providing a device having a body and surface means associated with said body for defining an opening through said body, said surface means being flexible;
   inserting a stem into said opening; and
   pulling said stem through said opening to engage thorns and foliage on said stem by said surface means.

6. The method in claim 5 wherein said step of providing includes mounting said device to a stationary support.

7. The method in claim 6 wherein said step of providing includes providing a device in which said body is made substantially entirely of a flexible material.

8. The method in claim 7 in which said flexible material is neoprene rubber.

9. The method in claim 7 in which said body includes edge means defining a slit extending from said opening to a perimeter edge of said body and wherein said step of inserting includes flexing said body adjacent said slit and inserting said stem through said slit to said opening.

10. The method in claim 9 wherein said flexing is performed by one hand of the user and said step of pulling is performed by the other hand of the user.

11. The method in claim 5 wherein said step of providing includes providing a device in which said body is made substantially entirely of a flexible material.

12. The method in claim 11 in which said body includes edge means defining a slit extending from said opening to a perimeter edge of said body and wherein said step of inserting includes flexing said body adjacent said slit and inserting said stem through said slit to said opening.

13. A method of removing thorns and foliage from plant stems including the steps of:
   providing a device having a body including a portion made of a flexible material and surface means defining an opening through said portion, said device further including means defining a slit extending from said opening to a perimeter edge of said portion;
   mounting said device to a stationary support;
   flexing said portion adjacent said slit to separate said portion at said slit;
   inserting a stem into said opening through said separated slit; and
   pulling said stem through said opening to engage thorns and foliage on said stem by said surface means.

14. The method of claim 13 wherein said step of flexing is performed by one hand of the operator and said steps of pulling and inserting are performed by the other hand of the operator.

15. The method in claim 13 wherein said body portion is made from approximately 0.25 inch rubber.

16. The method in claim 15 wherein said body portion is made from neoprene rubber.

17. The method in claim 16 wherein said body portion includes substantially the entire said body.

* * * * *